(12) United States Patent
Wang

(10) Patent No.: US 7,866,335 B2
(45) Date of Patent: Jan. 11, 2011

(54) AIR VALVE CONNECTING DEVICE FOR CONNECTING DIFFERENT VALVES

(76) Inventor: Lopin Wang, 16F-2, No. 62, Sec. 2, Chonder 2nd Road, Beitun Chu, Taichung (TW) 40652

( * ) Notice: Subject to any disclaimer, the term of this patent is extended or adjusted under 35 U.S.C. 154(b) by 400 days.

(21) Appl. No.: 12/006,340

(22) Filed: Jan. 2, 2008

(65) Prior Publication Data

US 2008/0236675 A1  Oct. 2, 2008

(30) Foreign Application Priority Data

Mar. 30, 2007 (TW) ................ 96205202 U

(51) Int. Cl.
*F16K 15/20* (2006.01)
(52) U.S. Cl. ...................... 137/231; 137/223
(58) Field of Classification Search .............. 137/223, 137/231; 251/263
See application file for complete search history.

(56) References Cited

U.S. PATENT DOCUMENTS

| | | | | |
|---|---|---|---|---|
| 1,868,165 A | * | 7/1932 | Hammond | ................ 137/223 |
| 5,819,781 A | * | 10/1998 | Wu | ............................ 137/231 |
| 6,105,600 A | | 8/2000 | Wang | ......................... 137/231 |
| 6,105,601 A | | 8/2000 | Wang | ......................... 137/231 |
| 6,146,116 A | * | 11/2000 | Wu et al. | .................... 417/569 |
| 6,289,920 B1 | * | 9/2001 | Wang | ......................... 137/223 |
| 6,328,057 B1 | | 12/2001 | Wang | ......................... 137/231 |
| 2003/0234042 A1 | * | 12/2003 | Delorme | .................... 137/231 |

* cited by examiner

*Primary Examiner*—John Rivell
(74) *Attorney, Agent, or Firm*—Charles E. Baxley

(57) ABSTRACT

An air valve connecting device includes a mouth attached to one end of a housing and having a compartment for engaging with a U.S. type valve, and having a bore for engaging with a French type valve, a barrel engaged onto the mouth, an actuator engaged in the housing and having a shank for engaging with the barrel for selectively receiving the French type valve, a tube engaged in the actuator for engaging with the French type valve, and the tube is extendible into the mouth for selectively engaging with the U.S. type valve, a handle includes a cam member for forcing the actuator to secure either the French type valve or the tube to the actuator, and for forcing the barrel and the mouth to engage with either the French type valve or the U.S. type valve.

9 Claims, 5 Drawing Sheets

AIR VALVE CONNECTING DEVICE FOR CONNECTING DIFFERENT VALVES

BACKGROUND OF THE INVENTION

1. Field of the Invention

The present invention relates to an air valve connecting head or device, and more particularly to an air valve connecting device including a simplified structure for easily connecting to different inflation valves of U.S. type and French type valves and for being easily manufactured with a decreased manufacturing cost.

2. Description of the Prior Art

Typical air valve connecting devices comprise a fitting port formed in one end of a valve housing for receiving or engaging with an inflation valve and for inflating the balls, the inner tires of the bicycles or the motorcycles or the vehicles.

For example, U.S. Pat. No. 6,328,057 to the present inventor, Wang discloses one of the typical air valve connecting heads for a hand-held air pump and also comprising a fitting port formed in an elastic annular block for engaging with an inflation valve.

However, normally, the typical air valve connecting heads may only be used for engaging with a single inflation valve only, such as a U.S. type valve and a French type valve, but may not be used for engaging with both of the inflation valves.

U.S. Pat. No. 6,105,600 to Wang, and U.S. Pat. No. 6,105,601 to Wang disclose two other typical air valve connecting heads for the hand-held air pump and comprising a fitting device for selectively or alternatively engaging with either of the U.S. type inflation valve or the French type inflation valve.

However, the typical air valve connecting heads comprise a structure that may not be easily operated or may not effectively grasping or holding the different inflation valves.

The present invention has arisen to mitigate and/or obviate the afore-described disadvantages of the conventional air valve connecting devices.

SUMMARY OF THE INVENTION

The primary objective of the present invention is to provide an air valve connecting device including a simplified structure for easily connecting to different inflation valves of U.S. type and French type valves and for being easily manufactured with a decreased manufacturing cost.

In accordance with one aspect of the invention, there is provided an air valve connecting device comprising a housing including a chamber formed therein, and including a first end portion, and including a second end portion, a mouth attached to the first end portion of the housing and including a compartment formed in the mouth for receiving and engaging with a U.S. type valve, and including a bore formed in the mouth and having an inner diameter smaller than that of the compartment of the mouth for receiving and engaging with a French type valve, a barrel engaged into the chamber of the housing and engaged onto the mouth, and including a bore formed therein for receiving and engaging with the French type valve, an actuator slidably engaged in the second end portion of the housing, and including a shank extended therefrom for engaging with the barrel, and including a chamber formed in the shank of the actuator for selectively receiving and engaging with the French type valve, and including at least one slit formed in the shank for forming at least one spring blade and for allowing the spring blade of the shank of the actuator to be selectively forced to engage with the French type valve and to retain the French type valve to the actuator, a first spring biasing device for biasing the actuator away from the barrel, a tube slidably engaged in the chamber of the shank of the actuator for selectively engaging with the French type valve, and the tube being extendible into the compartment of the mouth for selectively engaging with the U.S. type valve, a second spring biasing device for biasing the tube to selectively engage with either the French type valve or the U.S. type valve, and a handle pivotally attached to the housing and including a cam member provided on one end thereof for engaging with the actuator and for forcing the spring blade of the actuator to selectively engage with either the French type valve or the tube, and for forcing the barrel and the mouth to selectively engage with and to solidly grasp and hold either the French type valve or the U.S. type valve.

The tube includes a peripheral flange extended therefrom for engaging with the second spring biasing device. The tube includes a peripheral recess formed therein, and the actuator includes a pawl extended from the spring blade for selectively engaging with either the peripheral recess of the tube or the French type valve. The tube includes a peripheral rib for forming the peripheral recess of the tube.

The barrel includes a frustum-shaped space formed therein, and the actuator includes a frustum-shaped segment formed in the spring blade of the shank for engaging with the frustum-shaped space of the barrel and for selectively forcing the pawl of the spring blade to selectively engage with either the peripheral recess of the tube or the French type valve.

The tube includes a cavity formed therein, and the actuator includes a stem extended into the chamber of the shank of the actuator for slidably engaging into the cavity of the tube.

The barrel includes a space formed therein, and the mouth includes a stud extended from the mouth for engaging with the space of the barrel and for anchoring the barrel to the mouth.

The mouth includes a peripheral flange extended therefrom for engaging with the first end portion of the housing and for anchoring the mouth to the housing.

A cover may further be provided and engaged with or attached to the housing and engaged with the peripheral flange of the mouth for securing the mouth to the housing.

The housing includes an outer thread formed in the first end portion of the, and the cover includes an inner thread formed therein for engaging with the outer thread of the housing and for detachably securing the cover to the housing.

The actuator includes a peripheral groove formed in an outer peripheral portion thereof for engaging with a sealing ring which is engaged with the housing and for making a water tight and an air tight seal between the actuator and the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
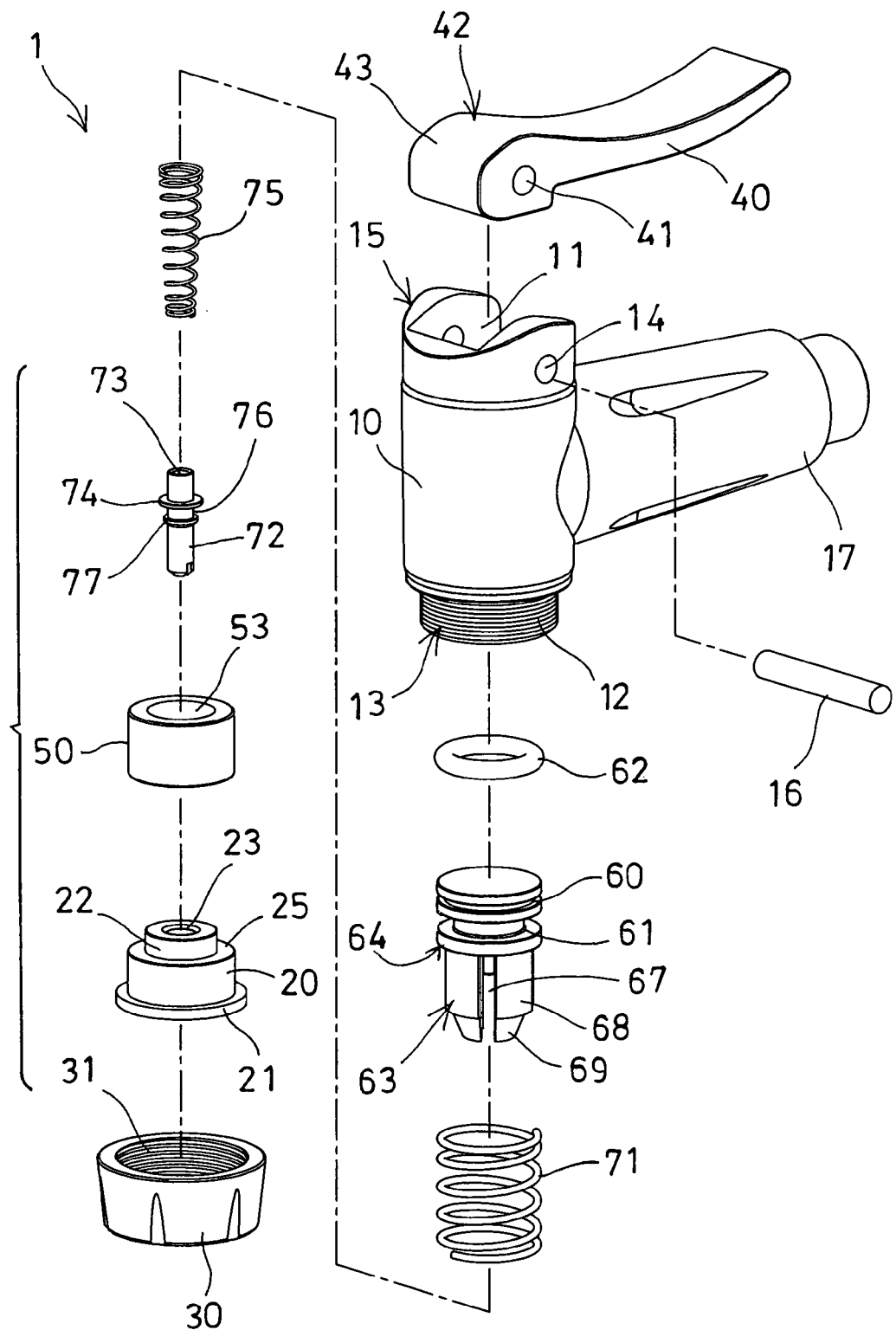
FIG. 1 is a partial exploded view of an air valve connecting device in accordance with the present invention.
Figure 2:
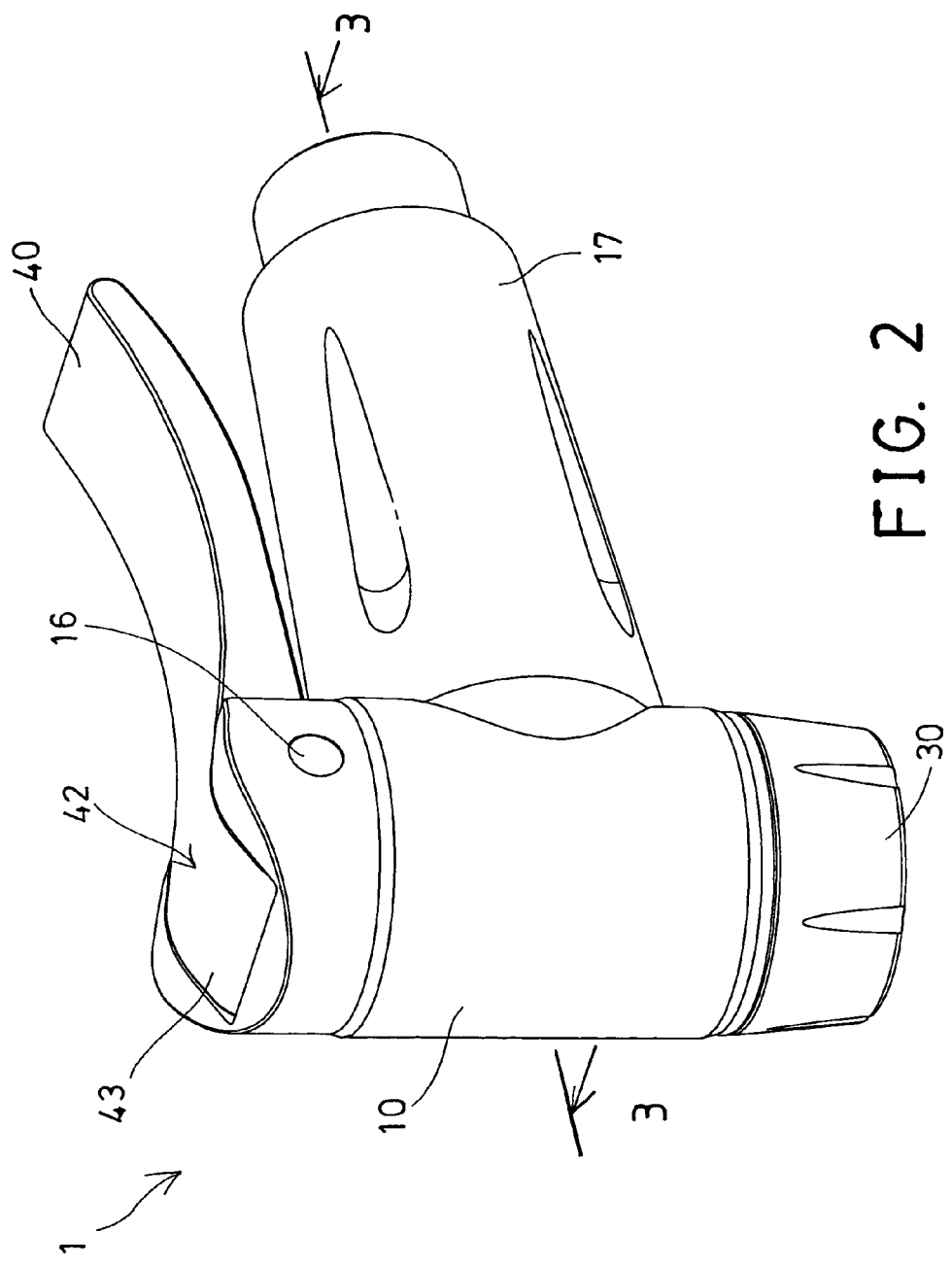
FIG. 2 is a perspective view of the air valve connecting device.
Figure 3:
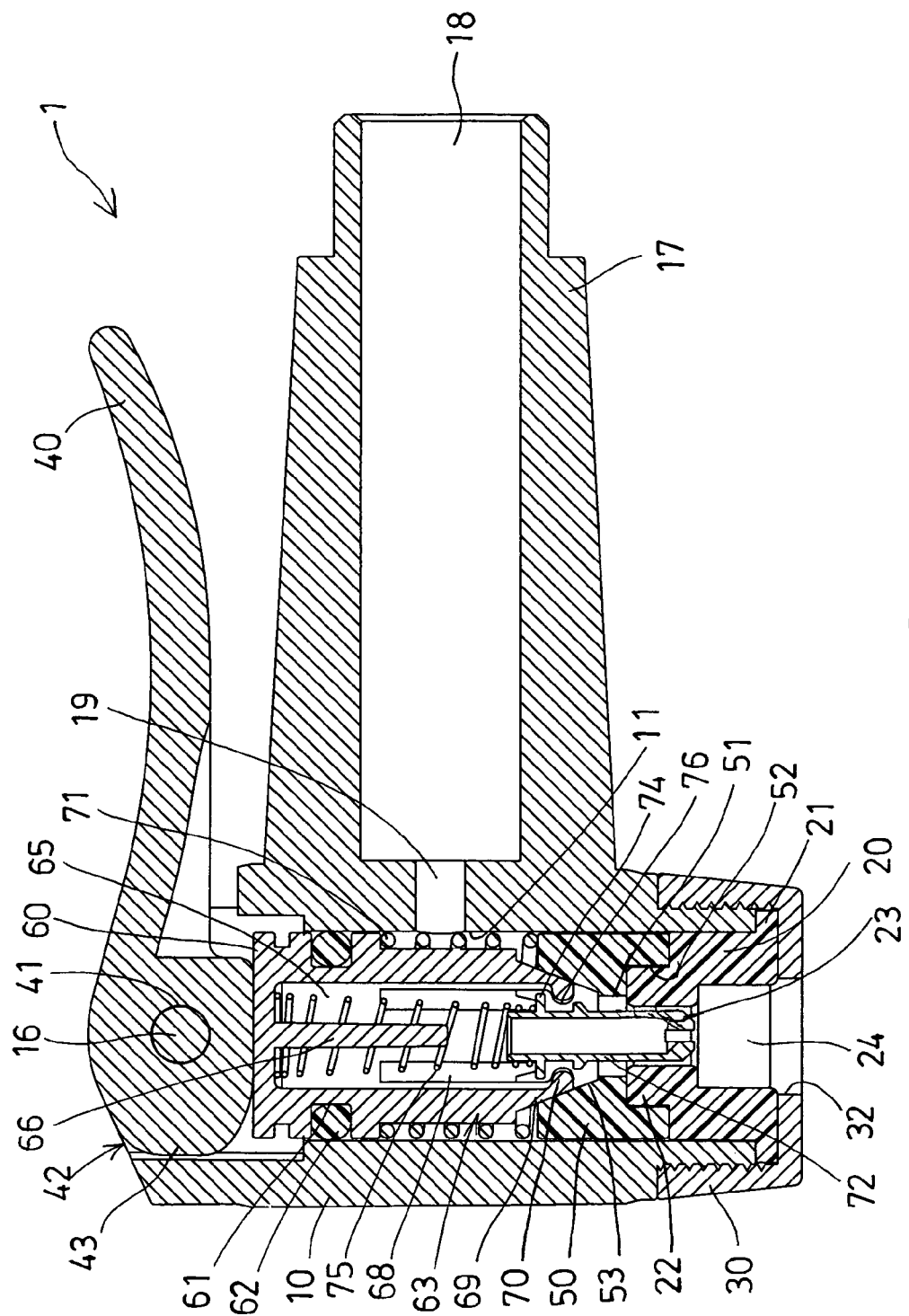
FIG. 3 is a cross sectional view of the air valve connecting device taken along lines 3-3 of FIG. 2.

Referring to the drawings, and initially to FIGS. 1-3, an air valve connecting device 1 in accordance with the present invention comprises a head body or housing 10 including a chamber 11 formed therein, and including an outer thread 12 formed in the first end or one end or the lower portion 13 thereof, and including a lateral orifice 14 formed therein, such as formed in the other one end or the upper portion 15 of the housing 10 and communicating with the chamber 11 of the housing 10 for receiving or engaging with an axle 16 which is laterally extended through the chamber 11 of the housing 10, and including a cylindrical casing 17 laterally extended from the housing 10 and substantially perpendicular to the housing 10, and including a bore 18 formed in the cylindrical casing 17 for coupling to an air pump (not shown) or the like, and including a passage 19 formed therein and communicating with the chamber 11 of the housing 10 and the bore 18 of the cylindrical casing 17.

Figure 4:
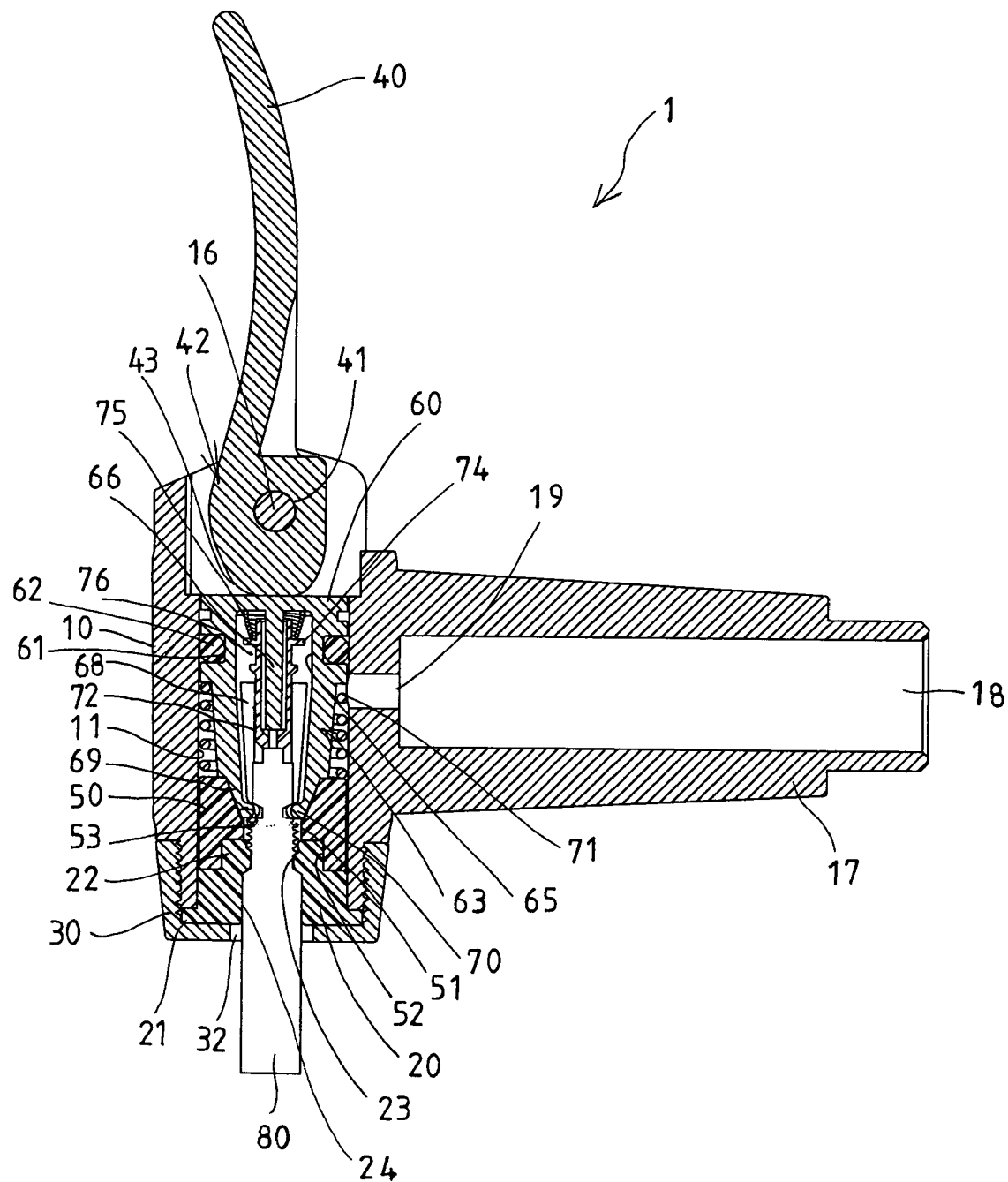
FIGS. 4, 5 are cross sectional views similar to FIG. 3, illustrating the operation of the air valve connecting device.

An elastic grasping member or mouth 20 is to be attached or engaged into the one end or the lower portion 13 of the housing 10, and includes a peripheral flange 21 extended laterally and outwardly therefrom for engaging with the lower portion 13 of the housing 10 and for anchoring the mouth 20 to the housing 10 and for preventing the mouth 20 from being completely engaged into the housing 10, and includes a stud 22 extended upwardly from the mouth 20 and having a bore 23 formed in the stud 22, and includes a compartment 24 formed in the mouth 20 and having an inner diameter greater than that of the bore 23 of the stud 22. The mouth 20 includes an outer diameter greater than that of the stud 22 for forming an outer peripheral shoulder 25 between the mouth 20 and the stud 22. It is preferable that the mouth 20 is made of soft or elastic materials, such as rubber, plastic or other synthetic materials for resiliently grasping the inflation valves 80, 88, such as the U.S. type valve 88 (FIG. 5) and the French type valve 80 (FIG. 4).

A cover 30 includes an inner thread 31 formed therein for engaging with the outer thread 12 of the housing 10 and for detachably attaching or securing the cover 30 to the housing 10, and the cover 30 may be engaged with the peripheral flange 21 of the mouth 20 for solidly anchoring or securing the mouth 20 to the housing 10. The cover 30 includes an opening 32 formed therein (FIGS. 3-5) and having an inner diameter greater than that of the compartment 24 of the mouth 20 for receiving or engaging with the inflation valves 80, 88, and for allowing the inflation valves 80, 88 to be engaged into the compartment 24 of the mouth 20 and/or engaged into the bore 23 of the stud 22, and thus for allowing the inflation valves 80, 88 to be resiliently grasped or held or secured to the housing 10 with the mouth 20 when the mouth 20 is compressed or actuated.

An actuating handle 40 includes an aperture 41 formed therein, such as formed in the one end 42 thereof for receiving or engaging with the axle 16 and for pivotally or rotatably attaching or securing the handle 40 to the housing 10 and for allowing the actuating handle 40 to be rotated relative to the housing 10 to selected angular positions. The handle 40 includes a cam member 43 formed or provided on the one end 42 thereof. A cylindrical grasping member or barrel 50 is further provided and engaged into the chamber 11 of the housing 10 and engaged onto the mouth 20, and includes a bore 51 formed therein, and includes a space 52 formed in the lower portion thereof and having an inner diameter greater than that of the bore 51 of the barrel 50 for receiving or engaging with the stud 22 of the mouth 20 and for stably anchoring the barrel 50 to the mouth 20, and includes an enlarged or inclined or cone or frustum-shaped space 53 formed in the upper portion thereof.

An actuating member or actuator 60 is slidably engaged in the other one end or the upper portion 15 of the housing 10, and includes a peripheral groove 61 formed in the outer peripheral portion thereof for receiving or engaging with a sealing ring 62 and for engaging with the inner peripheral portion of the housing 10 and for making a water tight or air tight seal between the actuator 60 and the housing 10, and includes a shank 63 extended downwardly therefrom for contacting or engaging with the barrel 50, and having an outer diameter smaller than that of the actuator 60 for forming an outer peripheral shoulder 64 between the shank 63 and the actuator 60, and for allowing the pressurized air from the air pump (not shown) to flow through the passage 19 of the housing 10 and to flow into the chamber 11 of the housing 10, and includes a chamber 65 formed in the shank 63 or the actuator 60, and includes a stem 66 extended downwardly into the chamber 65 of the shank 63 or the actuator 60.

The actuator 60 includes one or more slits 67 longitudinally formed in the outer peripheral portion of the shank 63 for forming two or more spring blades 68, and includes an inclined or cone or frustum-shaped segment 69 formed in the lower portion of the shank 63 for engaging with the cone or frustum-shaped space 53 of the barrel 50 and for selectively forcing the spring blades 68 toward each other or toward the center portion of the actuator 60, and includes a projection or pawl 70 extended radially and inwardly from each of the cone or frustum-shaped segments 69 or of the spring blades 68, and the pawls 70 may be forced to move toward each other (FIGS. 4, 5) when the actuator 60 is moved downwardly toward the barrel 50 and/or the mouth 20. A spring biasing means or member 71 is engaged between the barrel 50 and the peripheral shoulder 64 of the actuator 60 for biasing or forcing the actuator 60 away from the barrel 50.

A valve pressing member or tube 72 is slidably engaged in the chamber 65 of the shank 63 or the actuator 60 for selectively engaging with the French type valve 80 (FIG. 4), and is slidable or extendible into the compartment 24 of the mouth 20 for selectively engaging with the U.S. type valve 88 (FIG. 5), and includes a cavity 73 formed therein for receiving or engaging with the stem 66 of the actuator 60 and for guiding the tube 72 to slide relative to the actuator 60, and includes a peripheral flange 74 extended laterally and outwardly therefrom for engaging with another spring biasing means or member 75 which is engaged with the actuator 60 for selectively biasing or forcing the tube 72 away from the stem 66 of the actuator 60 and for biasing or forcing the tube 72 toward and to engage with the inflation valves 80, 88 (FIGS. 4, 5), and includes a peripheral recess 76 formed in the outer peripheral portion thereof and formed or defined by the peripheral flange 74 and another peripheral rib 77 of the tube 72.

Figure 5:
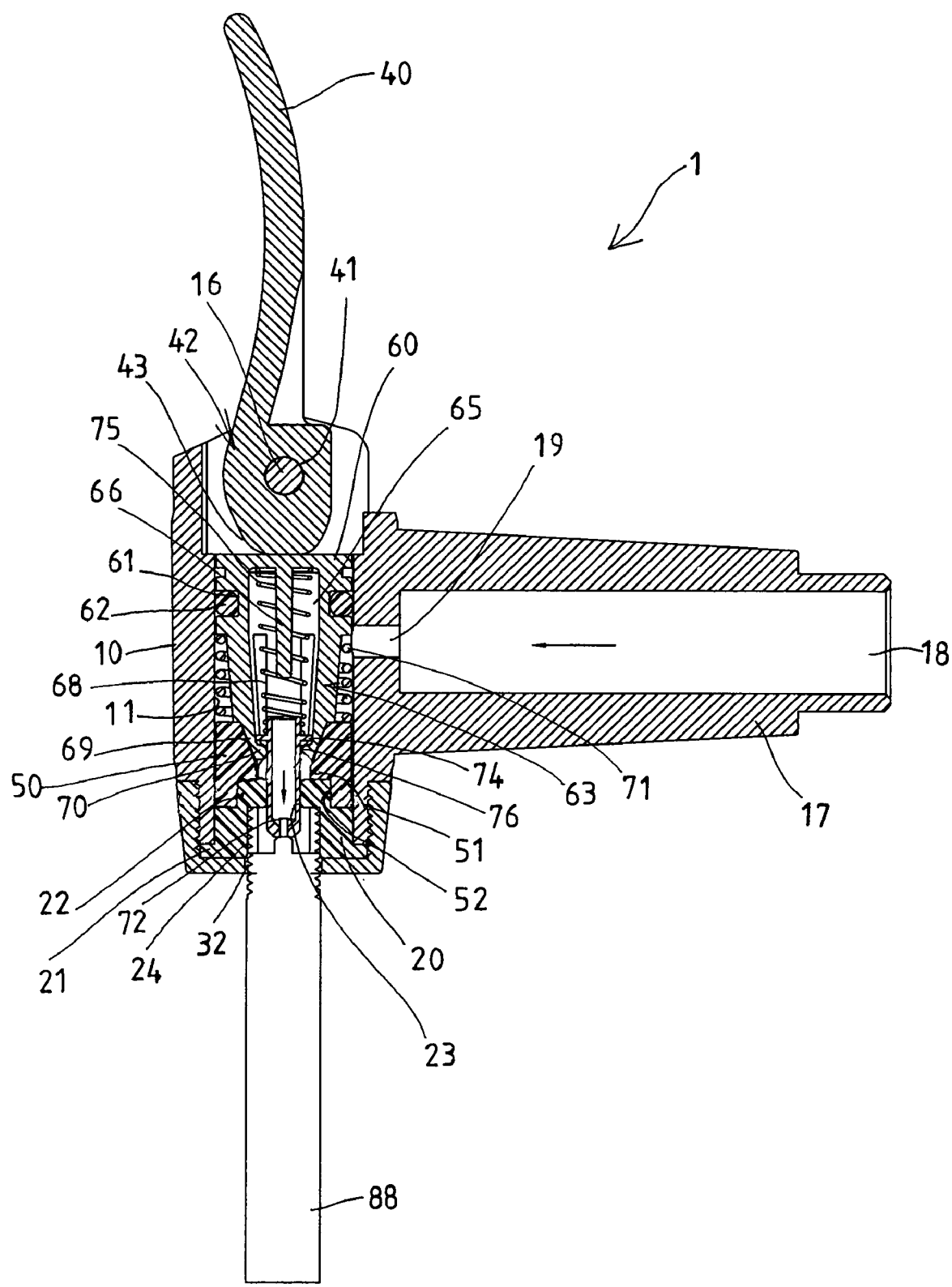

In operation, as shown in FIG. 5, a U.S. type valve 88 may be engaged through the opening 32 of the cover 30 and may be engaged into the compartment 24 of the mouth 20, and the tube 72 may be forced to engage with the U.S. type valve 88 by the spring member 75. The cam member 43 may then be forced to engage with the actuator 60 by rotating the actuating handle 40 relative to the actuator 60 and the housing 10 to the perpendicular working position, at this moment, the actuator 60 may be forced to move downwardly toward the barrel 50 and/or the mouth 20, and the pawls 70 of the spring blades 68 may be forced to move toward each other and may be forced to engage with the peripheral recess 76 and/or the peripheral rib 77 of the tube 72, in order to solidly force the tube 72 to engage with the U.S. type valve 88. The actuator 60 may also be forced to engage with the barrel 50 and the mouth 20 and to force the mouth 20 to solidly engage with and grasp the U.S. type valve 88.

Alternatively, as shown in FIG. 4, the French type valve 80 may be engaged through the opening 32 of the cover 30 and may be engaged into the compartment 24 of the mouth 20 and may also be engaged into the chamber 65 of the shank 63 or the actuator 60, and may force the tube 72 to engage with the spring member 75. The cam member 43 may then be forced to engage with the actuator 60 by rotating the actuating handle 40 relative to the actuator 60 and the housing 10 to the perpendicular working position, at this moment, the actuator 60 may be forced to move downwardly toward the barrel 50 and/or the mouth 20, and the pawls 70 of the spring blades 68 may be forced to move toward each other and may be forced to engage with the French type valve 80 in order to solidly retain the French type valve 80 to the actuator 60 and the housing 10. The actuator 60 may also be forced to engage with the barrel 50 and the mouth 20 and to force the mouth 20 to solidly engage with and grasp the French type valve 80.

Accordingly, the air valve connecting device in accordance with the present invention includes a simplified structure for easily connecting to different inflation valves of U.S. type and French type valves and for being easily manufactured with a decreased manufacturing cost.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
    a housing including a chamber formed therein, and including a first end portion, and including a second end portion,
    a mouth attached to said first end portion of said housing and including a compartment formed in said mouth for receiving and engaging with a U.S. type valve, and including a bore formed in said mouth and having an inner diameter smaller than that of said compartment of said mouth for receiving and engaging with a French type valve,
    a barrel engaged into said chamber of said housing and engaged onto said mouth, and including a bore formed therein for receiving the French type valve, said barrel including a frustum-shaped space formed therein,
    an actuator slidably engaged in said second end portion of said housing, and including a shank extended therefrom for engaging with said barrel, and including a chamber formed in said shank of said actuator for selectively receiving and engaging with the French type valve, and including at least one slit formed in said shank for forming at least one spring blade and for allowing said at least one spring blade of said shank of said actuator to be selectively forced to engage with the French type valve and to retain the French type valve to said actuator, said actuator including a pawl extended from said at least one spring blade for selectively engaging with the French type valve, and said actuator including a frustum-shaped segment formed in said at least one spring blade of said shank,
    a first spring biasing member for biasing said actuator away from said barrel,
    a tube slidably engaged in said chamber of said shank of said actuator for selectively engaging with the French type valve, and said tube being extendible into said compartment of said mouth for selectively engaging with the U.S. type valve, said tube including a peripheral recess formed therein, said pawl of said actuator being selectively engageable with said peripheral recess of said tube, said frustum-shaped segment of said actuator being selectively engageable with said frustum-shaped space of said barrel for selectively forcing said pawl of said at least one spring blade to selectively engage with either said peripheral recess of said tube or the French type valve,
    a second spring biasing member for biasing said tube to selectively engage with either the French type valve or the U.S. type valve, and
    a handle pivotally attached to the housing and including a cam member provided on one end thereof for engaging with said actuator and for forcing said at least one spring blade of said actuator to selectively engage with either the French type valve or said tube, and for forcing said mouth to selectively engage with either the French type valve or the U.S. type valve.

2. The air valve connecting device as claimed in claim 1, wherein said tube includes a peripheral flange extended therefrom for engaging with said second spring biasing member.

3. The air valve connecting device as claimed in claim 1, wherein said tube includes a peripheral rib for forming said peripheral recess of said tube.

4. The air valve connecting device as claimed in claim 1, wherein said tube includes a cavity formed therein, and said actuator includes a stem extended into said chamber of said shank of said actuator for slidably engaging into said cavity of said tube.

5. The air valve connecting device as claimed in claim 1, wherein said barrel includes a space formed therein, and said mouth includes a stud extended from said mouth for engaging with said space of said barrel and for anchoring said barrel to said mouth.

6. The air valve connecting device as claimed in claim 1, wherein said mouth includes a peripheral flange extended therefrom for engaging with said first end portion of said housing and for anchoring said mouth to said housing.

7. The air valve connecting device as claimed in claim 6, wherein a cover is attached to said housing and engaged with said peripheral flange of said mouth for securing said mouth to said housing.

8. The air valve connecting device as claimed in claim 7, wherein said housing includes an outer thread formed in said first end portion of, and said cover includes an inner thread formed therein for engaging with said outer thread of said housing and for detachably securing said cover to said housing.

9. The air valve connecting device as claimed in claim 1, wherein said actuator includes a peripheral groove formed in an outer peripheral portion thereof for engaging with a sealing ring which is engaged with said housing and for making a water tight and an air tight seal between said actuator and said housing.

* * * * *